United States Patent [19]

Nohr et al.

[11] Patent Number: 5,744,548
[45] Date of Patent: Apr. 28, 1998

[54] MELT-EXTRUDABLE THERMOPLASTIC POLYPROPYLENE COMPOSITION AND NONWOVEN WEB PREPARED THEREFROM

[75] Inventors: Ronald Sinclair Nohr, Roswell; John Gavin MacDonald, Decatur; Peter Michelovich Kobylivker, Marietta, all of Ga.

[73] Assignee: Kimberly-Clark Worldwide, Inc., Neenah, Wis.

[21] Appl. No.: 739,530

[22] Filed: Oct. 30, 1996

Related U.S. Application Data

[60] Continuation of Ser. No. 448,067, May 23, 1995, abandoned, which is a division of Ser. No. 321,720, Oct. 12, 1994, abandoned.

[51] Int. Cl.$^6$ .................................................... C08L 83/04
[52] U.S. Cl. ........................... 525/106; 525/240; 524/269
[58] Field of Search ................................. 525/106, 240; 524/269

[56] References Cited

U.S. PATENT DOCUMENTS

| | | | |
|---|---|---|---|
| 3,016,599 | 1/1962 | Perry, Jr. | 28/78 |
| 3,271,340 | 9/1966 | Shearer, Jr. et al. | 260/28.5 |
| 3,341,394 | 9/1967 | Kinney | 161/72 |
| 3,607,616 | 9/1971 | Barbehenn et al. | 161/252 |
| 3,650,866 | 3/1972 | Prentice | 156/181 |
| 3,655,862 | 4/1972 | Dorschner et al. | 264/290 |
| 3,689,597 | 9/1972 | Mahlman | 260/897 R |
| 3,692,618 | 9/1972 | Dorschner et al. | 171/62 |
| 3,704,198 | 11/1972 | Prentice | 161/148 |
| 3,705,068 | 12/1972 | Dobo et al. | 156/441 |
| 3,755,527 | 8/1973 | Keller et al. | 264/210 |
| 3,802,817 | 4/1974 | Matsuki et al. | 425/66 |
| 3,849,241 | 11/1974 | Butin et al. | 161/169 |
| 3,853,651 | 12/1974 | Porte | 156/73.6 |
| 3,865,897 | 2/1975 | Falender et al. | 260/827 |
| 3,898,209 | 8/1975 | Watson et al. | 260/93.7 |
| 4,064,605 | 12/1977 | Akiyama et al. | 28/103 |
| 4,100,324 | 7/1978 | Anderson et al. | 428/288 |
| 4,118,531 | 10/1978 | Hauser | 428/224 |
| 4,189,338 | 2/1980 | Ejima et al. | 156/167 |
| 4,265,801 | 5/1981 | Moody et al. | 260/40 R |
| 4,274,932 | 6/1981 | Williams et al. | 204/159.2 |
| 4,287,108 | 9/1981 | Grigo et al. | 260/29.1 |
| 4,296,022 | 10/1981 | Hudson | 260/42.46 |
| 4,340,563 | 7/1982 | Appel et al. | 264/518 |
| 4,434,204 | 2/1984 | Hartman et al. | 428/198 |
| 4,446,090 | 5/1984 | Lovgren et al. | 264/211 |
| 4,472,556 | 9/1984 | Lipowitz et al. | 525/106 |
| 4,487,858 | 12/1984 | Lovgren et al. | 523/348 |
| 4,514,534 | 4/1985 | DiNardo | 524/108 |
| 4,535,113 | 8/1985 | Foster et al. | 524/262 |
| 4,632,861 | 12/1986 | Vassilatos | 428/296 |
| 4,663,220 | 5/1987 | Wisneski et al. | 428/221 |
| 4,741,944 | 5/1988 | Jackson et al. | 428/152 |
| 4,766,029 | 8/1988 | Brock et al. | 428/286 |
| 4,851,284 | 7/1989 | Yamanoi et al. | 428/284 |
| 4,857,251 | 8/1989 | Nohr et al. | 264/103 |
| 4,888,704 | 12/1989 | Topliss et al. | 364/500 |
| 4,920,168 | 4/1990 | Nohr et al. | 524/188 |
| 4,923,914 | 5/1990 | Nohr et al. | 524/99 |
| 4,931,492 | 6/1990 | Foster et al. | 524/188 |
| 4,948,820 | 8/1990 | Addeo et al. | 523/124 |
| 4,960,810 | 10/1990 | Foster et al. | 524/265 |
| 4,980,227 | 12/1990 | Sekiguchi et al. | 428/241 |
| 5,057,262 | 10/1991 | Nohr et al. | 264/211 |
| 5,082,720 | 1/1992 | Hayes | 428/224 |
| 5,114,646 | 5/1992 | Nohr et al. | 264/103 |
| 5,120,888 | 6/1992 | Nohr et al. | 524/99 |
| 5,158,727 | 10/1992 | Coleman-Kammula | 264/109 |
| 5,173,356 | 12/1992 | Eaton et al. | 428/219 |
| 5,213,881 | 5/1993 | Timmons et al. | 428/224 |
| 5,218,052 | 6/1993 | Cohen et al. | 525/240 |
| 5,224,724 | 7/1993 | Antonacci et al. | 428/288 |
| 5,227,224 | 7/1993 | Ishikawa et al. | 428/212 |
| 5,258,129 | 11/1993 | Kato et al. | 252/8.9 |
| 5,281,378 | 1/1994 | Kozulla | 264/83 |
| 5,288,348 | 2/1994 | Modrak | 156/62.2 |
| 5,318,735 | 6/1994 | Kozulla | 264/83 |
| 5,344,862 | 9/1994 | Nohr et al. | 524/269 |
| 5,368,919 | 11/1994 | Robeson | 428/224 |
| 5,376,430 | 12/1994 | Swenson et al. | 428/152 |
| 5,409,992 | 4/1995 | Eppert, Jr. | 525/88 |
| 5,413,655 | 5/1995 | Nohr et al. | 156/167 |
| 5,414,027 | 5/1995 | DeNicola, Jr. et al. | 522/112 |
| 5,422,178 | 6/1995 | Swenson et al. | 428/343 |

FOREIGN PATENT DOCUMENTS

| | | | |
|---|---|---|---|
| 0 014 442 | 8/1980 | European Pat. Off. | C08L 23/00 |
| 0 552 013 | 7/1993 | European Pat. Off. | |
| 0 591 676 | 4/1994 | European Pat. Off. | |
| 1 116 823 | 6/1968 | United Kingdom . | |
| 94/09066 | 4/1994 | WIPO | C08K 9/06 |

*Primary Examiner*—Ralph H. Dean
*Attorney, Agent, or Firm*—William E. Maycock

[57] ABSTRACT

A melt-extrudable thermoplastic polypropylene composition having a melt flow rate in a range of from about 18 to about 30 g/10 minutes at a temperature of 190° C. and a load of 2.16 kg, a polydispersity less than 4, and a Z-average molecular weight greater than 300,000 as determined by differential refractometry. The composition may include a first thermoplastic polypropylene having a melt flow rate lower than 18 g/10 minutes at a temperature of 190° C. and a load of 2.16 kg and a second thermoplastic polypropylene having a melt flow rate higher than 18 g/10 minutes at a temperature of 190° C. and a load of 2.16 kg. The weight ratio of the first polypropylene to the second polypropylene is in a range of from about 90:10 to about 10:90. The composition may include from about 0.1 to about 1 percent by weight, based on the weight of the first and second thermoplastic polypropylenes, of a defined alkyl-substituted polysiloxane. A method of forming a nonwoven web also is provided, which method involves compounding the melt-extrudable thermoplastic polypropylene composition composed of a first and second thermoplastic polypropylene as described above. The compounded thermoplastic composition is melt-extruded through a die to form continuous fibers. The continuous fibers are quenched to a solid state, drawn or attenuated, and randomly deposited on a moving foraminous surface as a web of entangled fibers. The composition may include the alkyl-substituted polysiloxane.

11 Claims, 4 Drawing Sheets

MELT-EXTRUDABLE THERMOPLASTIC POLYPROPYLENE COMPOSITION AND NONWOVEN WEB PREPARED THEREFROM

This application is a continuation of application Ser. No. 08/448,067 entitled "MELT-EXTRUDABLE THERMOPLASTIC POLYPROPYLENE COMPOSITION AND NONWOVEN WEB PREPARED THEREFROM" and filed in the U.S. Patent and Trademark Office on May 23, 1995 now abandoned. The entirety of this Application is hereby incorporated by reference, which is a division of Ser. No. 08/321,720 filed Oct. 12, 1994, now abandoned.

BACKGROUND OF THE INVENTION

The present invention relates to a melt-extrudable thermoplastic composition and to the preparation of nonwoven webs therefrom.

Nonwoven webs are porous, textile-like materials which are composed primarily or entirely of fibers assembled in flat sheet form. The tensile properties of such webs may depend on frictional forces or on a film-forming polymeric additive functioning as a binder. All or some of the fibers may be welded to adjacent fibers by a solvent or by the application of heat and pressure. A nonwoven web may be reinforced with a scrim, gauze, netting, yarn, or other conventional sheet material. A nonwoven web may be incorporated as a component in a composite structure or laminate.

Nonwoven webs currently are employed in a variety of such disposable absorbent or protective products as diapers; incontinent products; feminine care products, such as tampons and sanitary napkins: wipes; towels; sterilization wraps; medical drapes, such as surgical drapes and related items; medical garments, such as hospital gowns, shoe covers, and the like; and industrial workwear, to name but a few. The nonwoven webs can be utilized as a single layer or as a component of a multilayered laminate or composite. When a multilayered laminate or composite is present, often each layer is a nonwoven web. Such multilayered structures are particularly useful for wipes, towels, industrial workwear, medical garments, medical drapes, and the like.

In order to improve the performance of a nonwoven-containing product, it sometimes is necessary to modify certain characteristics of the fibers of which the web is composed. A classic example is the modification of the hydrophobicity of polyolefin fibers by a topical treatment of the web with a surfactant or through the use of a melt additive.

Efforts also have been made to enhance or increase the tensile strength characteristics of nonwoven webs, particularly for such applications as sterilization wraps and industrial workwear. For example, U.S. Pat. No. 5,344,862 to Ronald S. Nohr and John G. MacDonald describes a melt additive system for thermoplastic polyolefins. The system includes two components. The first component is a polysiloxane polyether and the second component is a hydrophobic fumed silica. The two components are blended together before being added to the polymer. Melt extrusion of the resulting composition yields either nonwoven webs having significantly increased tensile strengths when compared to nonwoven webs prepared from the polymer alone or wettable webs requiring an amount of the first component which is significantly less than that required in the absence of the second component.

Another two-component system is described in U.S. application Ser. No. 07/958,630, which was filed on Oct. 9, 1992 now abandoned, in the names of Ronald S. Nohr and John G. MacDonald (see also PCT application Ser. No. US93/09748, having International Publication No. WO 94/09066). The first component is the alkyl-substituted polysiloxane employed in the present invention and the second component is a hydrophobic fumed silica. The second component desirably is destructured in order to reduce the longest dimension of the silica particles to within a range of from about 0.001 to about 1 micrometer. When the additive system is mixed with a thermoplastic polyolefin, the resulting composition yields nonwoven webs having significantly increased tensile strengths when compared to nonwoven webs prepared from the polymer alone. The thermoplastic polyolefin may be a blend of two propylene polymers having different melt flow rates. For example, such blend may consist of from about 60 to about 40 percent by weight of a polypropylene having a melt flow rate of from about 30 to about 45 g/10 minutes and from about 40 to about 60 percent by weight of a polypropylene having a melt flow rate of from about 2 to about 20 g/10 minutes.

While either of the above-described additive systems is effective in increasing the tensile strength characteristics of nonwoven webs prepared by melt extruding compositions consisting of a thermoplastic polyolefin and an additive system, the two-component additive systems involve an additional processing step which requires considerable care in execution if the desired results are to be realized.

SUMMARY OF THE INVENTION

The present invention addresses some of the difficulties and problems discussed above by providing the melt-extrudable thermoplastic composition described herein. The invention is grounded in the discovery that increased tensile strength characteristics can be achieved (a) in the absence of the hydrophobic fumed silica which is required in both of the additive systems described above and (b) even in the absence of both the alkyl-substituted polysiloxane and the hydrophobic fumed silica required by the additive system of application Ser. No. 07/958,630, now abandoned. That these results are unexpected and surprising will become apparent from the specification and claims which follow.

The melt-extrudable thermoplastic polypropylene composition provided by the present invention has a melt flow rate in a range of from about 18 to about 30 g/10 minutes at a temperature of 190° C. and a load of 2.16 kg, a polydispersity less than 4, and a Z-average molecular weight greater than 300,000 as determined by differential refractometry. The melt flow rate of the composition may be in a range of from about 19 to about 22 g/10 minutes.

The composition may include a first thermoplastic polypropylene and a second thermoplastic polypropylene. The first thermoplastic polypropylene may have a melt flow rate lower than 18 g/10 minutes at a temperature of 190° C. and a load of 2.16 kg. For example, the melt flow rate of the first thermoplastic polypropylene may be lower than about 15 g/10 minutes. As another example, the melt flow rate of the first thermoplastic polypropylene may be lower than about 11 g/10 minutes. As still another example, the melt flow rate of the first thermoplastic polypropylene may be in a range of from about 1 to about 10 g/10 minutes.

The second thermoplastic polypropylene may have a melt flow rate higher than 18 g/10 minutes at a temperature of 190° C. and a load of 2.16 kg. For example, the melt flow rate of the second thermoplastic polypropylene may be higher than about 20 g/10 minutes. As another example, the melt flow rate of the second thermoplastic polypropylene may be in a range of from about 20 to about 50 g/10 minutes.

As yet another example, the melt flow rate of the second thermoplastic polypropylene may be in a range of from about 30 to about 40 g/10 minutes.

The weight ratio of the first polypropylene to the second polypropylene generally will be in a range of from about 90:10 to about 10:90. By way of example, the weight ratio of the first polypropylene to the second polypropylene may be in a range of from about 80:20 to about 40:60.

The composition may include from about 0.1 to about 1 percent by weight, based on the weight of polypropylene, or of first and second thermoplastic polypropylenes, if present, of an alkyl-substituted polysiloxane having the general formula,

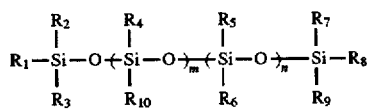

in which:

$R_1$–$R_9$ are independently selected monovalent $C_1$–$C_3$ alkyl groups;

$R_{10}$ is a monovalent $C_6$–$C_{30}$ alkyl group:

m represents an integer of from about 5 to about 50;

n represents an integer of from 0 to about 200;

the alkyl-substituted polysiloxane has a number-average molecular weight of from about 3,000 to about 36,000; and the alkyl-substituted polysiloxane has a polydispersity of from about 1.1 to about 2.5.

The alkyl-substituted polysiloxane provides two benefits. First, the material aids in the melt-extrusion of the composition. Second, the material unexpectedly results in improved tensile strength properties when compared to the melt extrusion of a composition lacking the polysiloxane. In certain embodiments, each of $R_1$–$R_9$ is a methyl group, $R_{10}$ is a monovalent $C_{15}$–$C_{22}$ alkyl group, m represents an integer of from about 15 to about 25, n represents an integer of from about 40 to about 80, and the alkyl-substituted polysiloxane has a number-average molecular weight of from about 8,000 to about 15,000.

The present invention also provides a method of forming a nonwoven web which involves compounding the melt-extrudable thermoplastic polypropylene composition composed of a first and second thermoplastic polypropylene as described above. The compounded thermoplastic composition is melt extruded through a die to form continuous fibers. The continuous fibers are quenched to a solid state, drawn or attenuated, and randomly deposited on a moving foraminous surface as a web of entangled fibers. The composition may include the alkyl-substituted polysiloxane as described above.

The present invention also provides a melt-extruded fiber and nonwoven web prepared from the above-described composition. The nonwoven web may be pattern bonded by the application of heat and pressure. Also provided are a disposable absorbent article, a disposable article, a multi-layer laminate, a garment, a sterilization wrap, a tent fabric, and a car or boat cover, each of which includes as a component thereof a nonwoven web of the present invention.

DETAILED DESCRIPTION OF THE INVENTION

Figure 1:
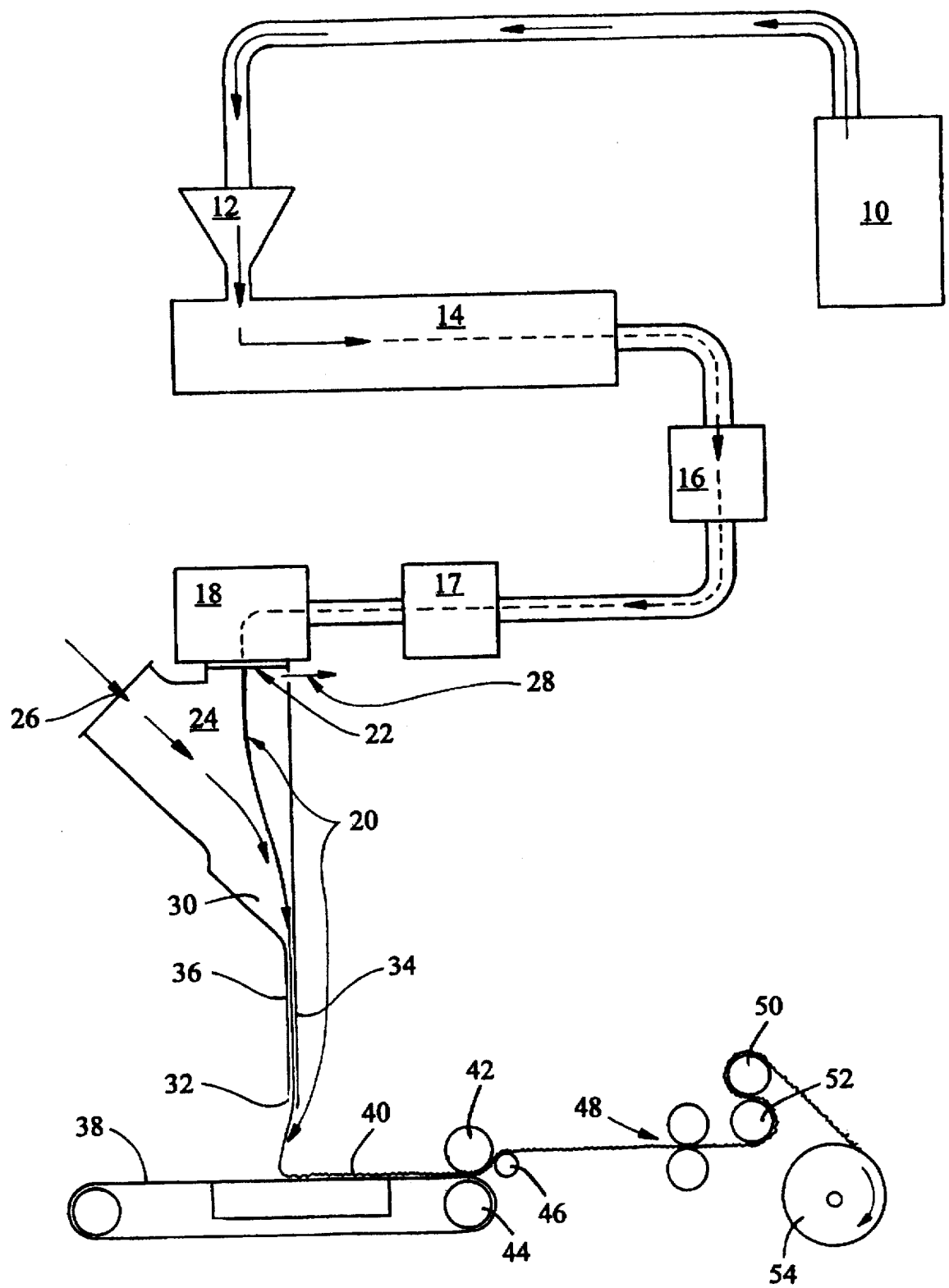
FIG. 1 is a generalized flow diagram illustrating the process of the present invention.

The term "tensile strength characteristics", as used herein, has reference primarily to peak energy, peak load, percent elongation, and peak strain values as determined by Federal Test Method 5100 (Standard No. 191A).

Such terms as "melt-extrudable", "melt-extruded", and the like are meant to refer or relate to any melt extrusion process for forming a nonwoven web in which melt extrusion to form continuous fibers is followed by web formation, typically concurrently, on a foraminous support, e.g., a spunbonding process. The terms also refer or relate to processes in which web formation is a separate, independent step after fiber formation; nonwoven webs prepared by such processes include bonded carded webs and the like.

As used herein, the term "weight ratio" means the approximate relationship by weight of the amount of a first thermoplastic polypropylene to the amount of a second thermoplastic polypropylene in the composition of the present invention. More specifically, the weight ratio is expressed as the parts per 100 parts of composition of the first and second thermoplastic polypropylenes, separated by a colon. Consequently, the weight ratio has no units.

The term "melt flow rate" refers to a melt flow rate determined in accordance with ASTM Method D 1238-82, Standard Test Method for Flow Rates of Thermoplastics by Extrusion Plastometer, using a Model VE 4-78 Extrusion Plastometer (Tinius Olsen Testing Machine Company, Willow Grove, Pa.) having an orifice diameter of 2.0955±0.0051 mm; unless specified otherwise, test conditions are at a temperature of 190° C. and a load of 2.16 kg.

The term "machine direction" is used herein to mean a direction which is the same as the direction of motion of the nonwoven web during its preparation. The term "cross-direction" is used herein to mean a direction which is the cross machine direction, i.e., a direction which is perpendicular to the machine direction.

As used herein, the term "compounding" or variations thereof means working the molten composition under the influence of heat and shear.

The melt-extrudable thermoplastic polypropylene composition of the present invention has a melt flow rate in a range of from about 18 to about 30 g/10 minutes at a temperature of 190° C. and a load of 2.16 kg. By way of example, the melt flow rate of the composition may be in a range of from about 19 to about 22 g/10 minutes. The composition also has a polydispersity less than 4, and a Z-average molecular weight greater than 300,000 as determined by differential refractometry.

The composition may include a first thermoplastic polypropylene having a melt flow rate lower than 18 g/10 minutes at a temperature of 190° C. and a load of 2.16 kg and a second thermoplastic polypropylene having a melt flow rate higher than 18 g/10 minutes at a temperature of 190° C. and a load of 2.16 kg. For example, the melt flow rate of the first thermoplastic polypropylene may be lower than about 15 g/10 minutes. As another example, the melt flow rate of the first thermoplastic polypropylene may be lower than about 11 g/10 minutes. As still another example, the melt flow rate of the first thermoplastic polypropylene may be in a range of from about 1 to about 10 g/10 minutes. As a practical matter, the selection of the melt flow rate of the first thermoplastic polypropylene largely is a matter of commercial availability. By way of illustration, first thermoplastic polypropylenes having melt flow rates of 5 and 10 g/10 minutes were employed in the examples.

Again by way of example, the melt flow rate of the second thermoplastic polypropylene may be higher than about 20 g/10 minutes. As another example, the melt flow rate of the second thermoplastic polypropylene may be in a range of from about 20 to about 50 g/10 minutes. As yet another example, the melt flow rate of the second thermoplastic polypropylene may be in a range of from about 30 to about 40 g/10 minutes. As with the first thermoplastic polypropylene, the selection of the melt flow rate of the second thermoplastic polypropylene depends largely on commercial availability. Again by way of illustration, the second thermoplastic polypropylene employed in the examples had a melt flow rate of 35 g/10 minutes.

The weight ratio of the first polypropylene to the second polypropylene is in a range of from about 90:10 to about 10:90. By way of example, the weight ratio of the first polypropylene to the second polypropylene may be in a range of from about 80:20 to about 40:60.

As already stated, the composition will have a melt flow rate in a range of from about 18 to about 30 g/10 minutes. When first and second polypropylenes are present, such melt flow rate typically is a function of (a) the melt flow rate of the first thermoplastic polypropylene, (b) the melt flow rate of the second thermoplastic polypropylene, (c) the weight ratio of the first thermoplastic polypropylene to the second thermoplastic polypropylene, and (d) the amounts of thermal and shear energy applied to the composition during compounding. Consequently, one having ordinary skill in the art may readily obtain a composition having a desired melt flow rate in the required range. Even if commercially available thermoplastic polypropylenes have limited choices of melt flow rates, the desired composition melt flow rate may be obtained without undue experimentation by adjusting either or both of the weight ratio of the two thermoplastic polypropylenes and the amounts of thermal and shear energy applied during compounding. Although shear energy generates heat, there still is some flexibility in the compounding process since the amount of thermal energy in excess of that required to render the composition sufficiently molten may be controlled. Because thermal and shear energy preferentially break down the higher molecular weight polymer components, increasing the amounts of thermal and shear energy results in an increase in the melt flow rate of the composition and decreases in both the weight-average and Z-average molecular weights.

The composition may include from about 0.1 to about 1 percent by weight, based on the weight of polypropylene, or of first and second thermoplastic polypropylenes, if present, of an alkyl-substituted polysiloxane having the general formula,

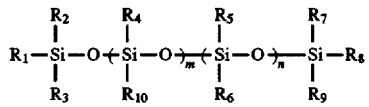

in which:

$R_1-R_9$ are independently selected monovalent $C_1-C_3$ alkyl groups;

$R_{10}$ is a monovalent $C_6-C_{30}$ alkyl group;

m represents an integer of from about 5 to about 50;

n represents an integer of from 0 to about 200;

the alkyl-substituted polysiloxane has a number-average molecular weight of from about 3,000 to about 36,000; and the alkyl-substituted polysiloxane has a polydispersity of from about 1.1 to about 2.5.

The alkyl-substituted polysiloxane provides two benefits. First, the material aids in the melt-extrusion of the composition. Second, the material unexpectedly results in improved tensile strength properties when compared to the melt-extrusion of a composition consisting only of polypropylene, e.g., first and second thermoplastic polypropylenes. In certain embodiments each of $R_1-R_9$ is a methyl group, $R_{10}$ is a monovalent $C_{15}-C_{22}$ alkyl group, m represents an integer of from about 15 to about 25, n represents an integer of from about 40 to about 80, and the alkyl-substituted polysiloxane has a number-average molecular weight of from about 8,000 to about 15,000.

The present invention also provides a method of forming a nonwoven web. Broadly stated, the method involves compounding the melt-extrudable thermoplastic composition composed of a first and second thermoplastic polypropylene as described above. The composition also may contain an alkyl-substituted polysiloxane as described above. Compounding typically is carried out in a twin-screw extruder in accordance with procedures well known to those having ordinary skill in the compounding art. Compounding can be carried out independent of the melt extrusion step. For example, the composition may be compounded and stored for future use. Alternatively, the composition may be compounded immediately prior to melt extrusion and then fed directly to the melt extrusion apparatus, or compounded within the extrusion apparatus itself.

In the melt extrusion step, continuous fibers are formed by extruding the compounded thermoplastic composition through a die. Although the die may have any desired configuration, it most often will have a plurality of orifices arranged in one or more rows extending the full machine width. Such orifices may be circular or noncircular in cross-section.

The resulting continuous fibers then are drawn, typically by entraining them in a fluid stream having a sufficiently high velocity. The continuous fibers are cooled in a quenching fluid prior to drawing; the quenching fluid usually is low pressure air. The fluid stream which draws the fibers, usually air, can be a stream of high velocity air separate from the quenching fluid, or it can be a portion of the quenching fluid which is accelerated by passage into a narrow nozzle.

The drawn fibers are collected on a moving foraminous surface as a web of entangled fibers. The foraminous surface may be, by way of example only, a revolving drum or a continuous belt or wire screen; the latter is most commonly used on commercial-scale equipment.

Some aspects of the method of the present invention are described in more detail in U.S. Pat. Nos. 3,016,599, 3,704, 198, 3,755,527, 3,849,241, 3,341,394, 3,655,862, 3,692,618, 3,705,068, 3,802,817, 3,853,651, 4,064,605, 4,340,563, 4,434,204, 4,100,324, 4,118,531, and 4,663,220, all of which are incorporated herein by reference.

The method of the present invention is further described by reference to FIG. 1 which is a generalized flow diagram illustrating a preferred embodiment of the process of the present invention.

Turning now to FIG. 1, the compounded thermoplastic composition is fed from a supply 10 to a hopper 12, then through an extruder 14, a filter 16, and a metering pump 17 to a die head 18 having a die face 22 with a plurality of orifices arranged in one or more rows generally in the cross-machine direction. As the continuous fibers emerge from the die face 22, they form a curtain of fibers 20 directed into a quench chamber 24. In the quench chamber 24, the fibers 20 are contacted with air or other cooling fluid through an inlet 26. The quenching fluid is maintained at a temperature which is lower than the temperature of the filaments 20, typically at ambient temperature, e.g., in the range of from about 4° C. to about 55° C. The quenching fluid is supplied under low pressure, i.e., less than about 12 psi, and preferably less than about 2 psi, and a portion is directed through the curtain of filaments 20 and removed as exhaust through a port 28. The proportion of quenching fluid supplied that is discharged as exhaust will depend upon the composition being used and the rapidity of quenching needed to give the desired fiber characteristics, such as denier, tenacity, and the like. In general, the greater the amount of fluid exhausted, the larger the resulting filament denier and, conversely, the lower the exhaust fluid ratio, the lower the filament denier.

As quenching is completed, the curtain of filaments 20 is directed through a smoothly narrowing lower end 30 of the quenching chamber into a nozzle 32 where the quenching fluid attains a velocity of from about 45 to about 245 meters per second. The nozzle 32 extends the full width of the machine, equivalent to the width of the die 22. The nozzle 32 typically is formed by a stationary wall 34 and a movable wall 36, both of which also span the width of the machine. The function of the movable wall 36 is described in U.S. Pat. No. 4,340,563, noted above.

After exiting the nozzle 32, the filaments 20 are collected on a moving foraminous surface such as an endless screen or belt 38 to form a nonwoven web 40. Before being removed from the belt or screen 38, the web 40 is passed under a compaction roll 42, optionally in conjunction with a guide roll 46. The compaction roll 42 conveniently is opposed by the forward drive and/or support roll 44 for the continuous foraminous belt or wire screen 38. Upon exiting the compaction roll 42, the web 40 typically is bonded at the roll nip 48. The web 40 then is passed around the tensioning rolls 50 and 52, after which the web 40 is wound on a take-up roll 54.

The present invention is further described by the examples which follow. Such examples, however, are not to be construed as limiting in any way either the spirit or the scope of the present invention.

EXAMPLE 1

This example describes the preparation of spunbonded nonwoven webs on a 14-inch (about 36-cm) pilot-scale apparatus essentially as described in U.S. Pat. No. 4,340,563.

Two first thermoplastic polypropylenes were studied and are referred to herein as Polymer I-A and Polymer I-B, respectively. Polymer I-A was Escorene 1052 polypropylene (Exxon Chemical Americas, Houston, Tex. 77079). According to the manufacturer, the polymer has a melt flow rate of 5 g/10 minutes. Polymer I-B was Escorene 1024 polypropylene (Exxon Chemical Americas, Houston, Tex. 77079). According to the manufacturer, the polymer has a melt flow rate of 10 g/10 minutes.

The second thermoplastic polypropylene, which also served as a control, was Escorene 3445 polypropylene (Exxon Chemical Americas, Houston, Tex. 77079). The polymer reportedly has a melt flow rate of 35 g/10 minutes. The polymer is referred to herein as Polymer II/C.

Two compositions were prepared as summarized in Table 1. The values given in the columns under the heading "Parts Designated Polymer" are parts by weight per 100 parts of the composition.

TABLE 1

Summary of Melt-Extrudable Compositions

| Composition | Parts Designated Polymer | | | Weight Ratio |
|---|---|---|---|---|
| | I-A | I-B | II/C | |
| Control | — | — | 100 | N/A |
| A | 60 | — | 40 | 60:40 |
| B | — | 20 | 80 | 20:80 |

The appropriate amounts or pellets of each of first and second thermoplastic polypropylene, typically totaling about 200 pounds (about 91 kg), were loaded into a Henschel Mixer (Type FM-250B, Purnell International, Houston, Tex.). The lid of the mixer was closed and the machine turned on for three minutes. The resulting mixture was placed in plastic-lined fiber drums.

The mixture then was compounded in a twin-screw extruder. The mixture as removed from the Henschel mixer was placed in a gravimetric feeder (Acrison Model No. 402-1200-250-BDF-1.5-H, Acrison Inc., Moonachie, N.J.). The mixture was fed by a screw feeder to a Verner Pfleiderer Twin Screw Extruder having 57-mm screws (Verner Pfleiderer, Stuttgart, Germany). The extruder had eight independently heated zones which were set at temperatures of 204° C. or 227° C., with the second through fifth zones being set at the higher temperature. The composition exited the extruder through a 15-hole plate having 0.125-inch (about 3.2-mm) holes; the temperature of the melt exiting the plate was 256° C. The resulting rods of the polymeric composition were quenched in a water bath and then passed sequentially over two vacuum slots and a hot air slot. The rods then passed through a rubber roll nip which maintained low tension on the rods and fed the dried rods into a Conair pelletizer (Conair, Bay City, Mich.). The resulting pellets were screened to remove pellets smaller than 0.0625 inch (about 1.6 mm) and larger than about 0.1875 inch (about 4.8 mm). The screened pellets were mixed in a ribbon blender, passed over magnets to remove metallic particles, and boxed.

In order to better understand the present invention and the effects of compounding, Polymers I-A and I-B and Composition A were subjected to molecular weight distribution analysis by means of gel permeation chromatography (GPC) with a differential refractometer detector. The results are summarized in Table 2.

TABLE 2

Summary of GPC Analysis

| Polymer | No.-Ave. MW | Wt.-Ave. MW | P.D. | Z-Ave. MW |
|---|---|---|---|---|
| Polymer I-A | 45,200 | 212,200 | 4.7 | 562,000 |
| Polymer II/C | 50,000 | 144,600 | 2.9 | 300,000 |
| Composition A | 42,800 | 166,000 | 3.9 | 421,000 |

Because Polymer I-A was present in Composition A at a level of 60 percent by weight, the mere blending, of the two polymers without working would be expected to give a weight-average molecular weight of about 185,000 and a Z-average molecular weight of about 457,000. Compounding resulted preferentially in decreases in the molecular weights of the higher molecular species in both components of Composition A. Consequently, the weight-average and Z-average molecular weights are closer to the corresponding values for Polymer II/C rather than the values for Polymer I-A, even though the amount of Polymer I-A exceeded that of Polymer II/C. The number-average molecular weight of Composition A was reduced by the compounding to a value below the values for the two components of the composition.

Each composition was melt-extruded to form a spunbonded nonwoven web. The more significant process variables for the spunbonding process generally were as follows:
extruder temperature, 175° C. –248° C.;
melt inlet temperature, 248° C.;
throughput, 25 kg per hour (0.7 grams per hole per minute);
spin head temperature, 248° C.;
pump block temperature, 248° C.;
pack pressure, 440 psig; and
melt temperature, 238° C.
Each nonwoven web had a basis weight of 1.6 ounces per square yard or osy (about 54 grams per square meter or gsm).

Mean peak energy, peak load, and percent elongation values for each web were determined in accordance with Federal Test Method 5100 (Standard No. 191A). The apparatus employed was an Instron Model 1122 Universal Testing Instrument with an Instron Micron II Desk Top Console Integrator (Instron Corporation, Canton, Mass.). The jaw span gap was 3 inches (7.6 cm) and web sample dimensions were 3"×6" (7.62 cm×15.2 cm). In general, at least ten samples from each web were run. Each web was tested in both the machine direction (MD) and the cross direction (CD). The data are summarized in Tables 3 and 4. Each web is identified by the composition name or letter from which it was prepared.

In order to aid in an appreciation of the extent of improvement or increase in each test parameter value which resulted from the use of a composition of the present invention, Tables 3 and 4 include "Percent Increase" columns after each test parameter value. In each case, the percent increase (PI) was calculated by subtracting the control value from the value obtained from the use of a composition of the present invention, dividing the difference by the first control value, and multiplying the quotient by 100; i.e., $PI=100\times$(improved value–control value)/control value.

TABLE 3

| | | Tensile Strength Characteristics | | | |
|---|---|---|---|---|---|
| Web | Direction | Peak Energy (m – kgF) | Percent Increase | Peak Load (kgF) | Percent Increase |
| Control | MD | 4.63 | — | 14.4 | — |
| | CD | 3.40 | — | 9.9 | — |
| A | MD | 7.58 | 64 | 19.6 | 36 |
| | CD | 6.03 | 77 | 14.2 | 44 |
| B | MD | 7.94 | 71 | 19.3 | 34 |
| | CD | 6.33 | 86 | 14.7 | 48 |

TABLE 4

| | | Tensile Strength Characteristics | |
|---|---|---|---|
| Web | Direction | Percent Elongation | Percent Increase |
| Control | MD | 47.9 | — |
| | CD | 60.8 | — |
| A | MD | 62.7 | 31 |
| | CD | 77.9 | 28 |

TABLE 4-continued

| | | Tensile Strength Characteristics | |
|---|---|---|---|
| Web | Direction | Percent Elongation | Percent Increase |
| B | MD | 69.1 | 44 |
| | CD | 82.2 | 36 |

Tables 3 and 4 demonstrate that the use of a composition of the present invention resulted in significant increases in the tensile strength characteristics of the nonwoven webs. In general, both peak energy improvements and peak load improvements were more pronounced in the cross direction than in the machine direction, while the opposite was the case with respect to improvements in percent elongation. That is, the percent increases in peak energy and peak load were higher in the cross direction than in the machine direction, whereas the percent increases in percent elongation were higher in the machine direction than in the cross direction. The differences in percent increases, however, were not large.

Figure 2:
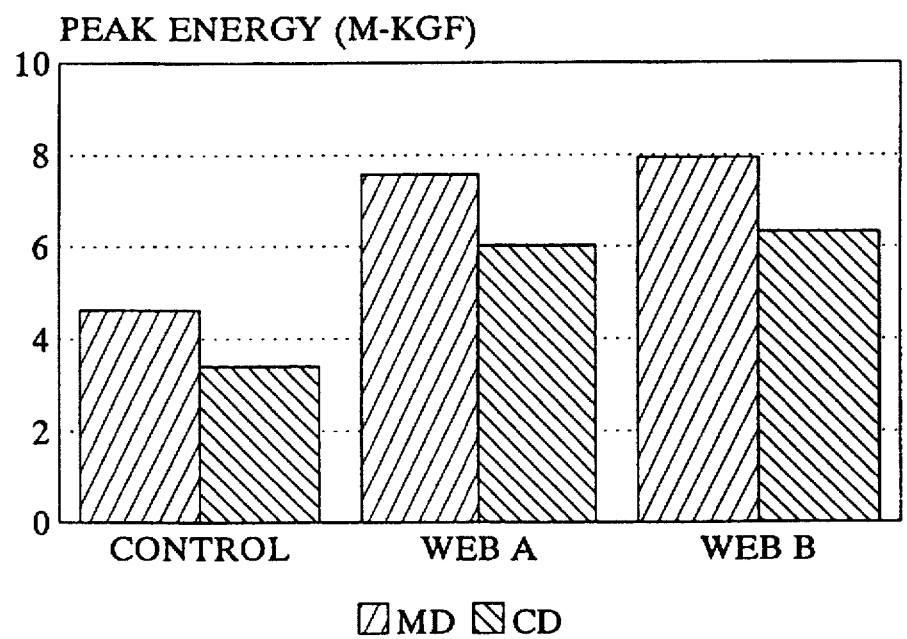
FIGS. 2–7, inclusive, are bar graphs comparing the tensile strength characteristics of nonwoven webs prepared in accordance with the present invention with such characteristics of control webs.
Figure 3:
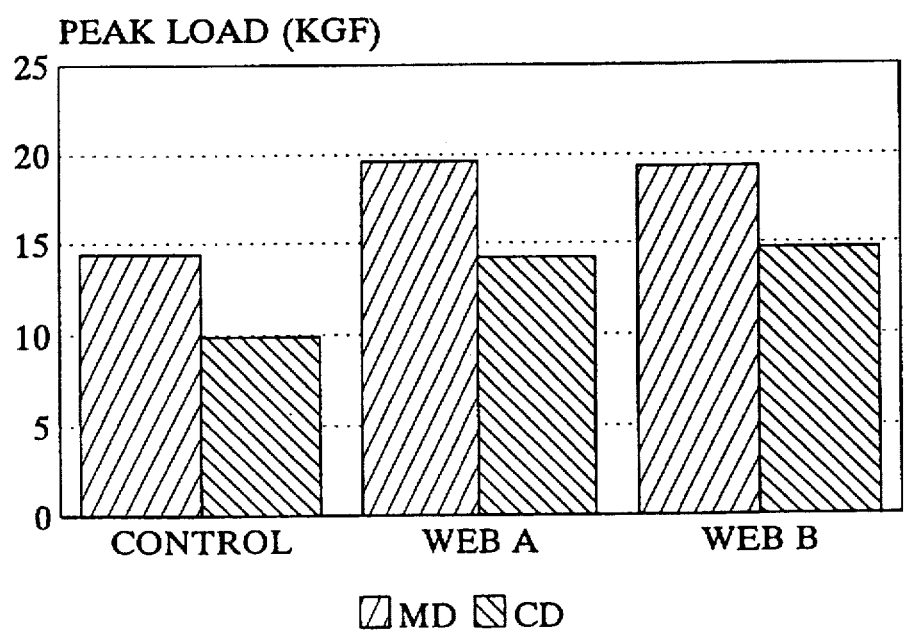
Figure 4:
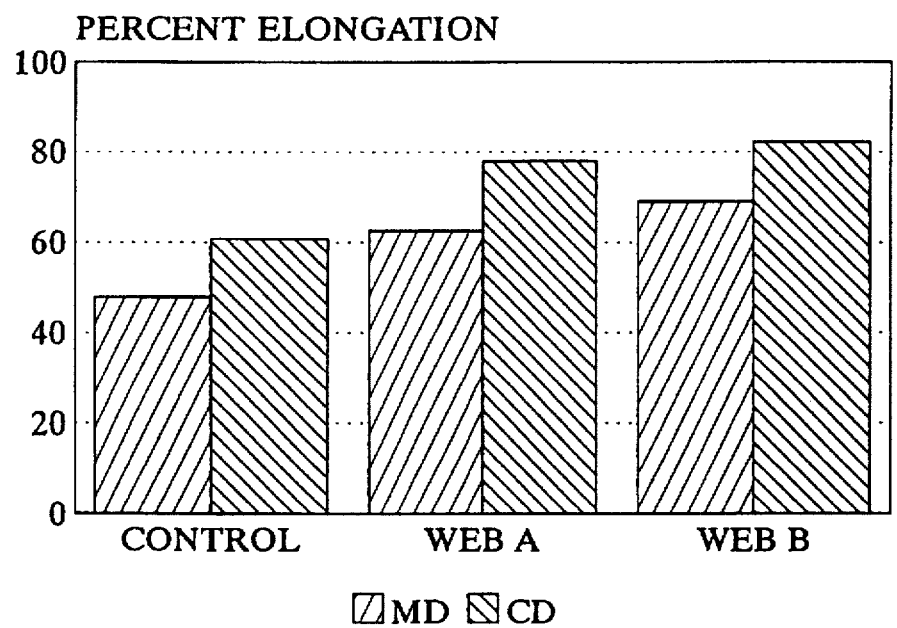

To aid in the visualization of the improvements demonstrated by the data in Tables 3 and 4, the data have been plotted as bar graphs as shown in FIGS. 2–4, inclusive. Both the machine direction value and the cross direction value for each web are included in each figure.

EXAMPLE 2

The procedure of Example 1 was repeated, except that different compositions were employed and a dual bank, commercial spunbonding apparatus was used. The two banks of the spunbonding machine were roughly 12 feet (about 3.7 meters) apart. The machine width was 60 inches (about 1.5 meters).

A single composition, in addition to a control, was studied. The composition (Composition C) consisted of 60 parts of Polymer I-A and 40 parts of Polymer II/C per 100 parts of polymers, plus 0.3 percent by weight, based on the weight of the two polymers, of an alkyl-substituted polysiloxane. The alkyl-substituted polysiloxane may be represented by the following formula:

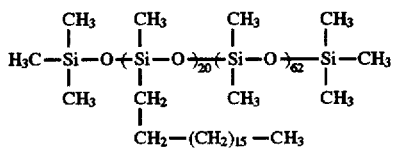

The material had a number-average molecular weight of about 11,000 and a polydispersity of about 1.3. Polymer II/C also served as a control. The composition was prepared and compounded as described in Example 1; the polysiloxane was poured over the polymer pellets in the Henschel mixer prior to mixing. The temperature of the melt exiting, the plate was 252° C.

The composition and the control polymer were melt extruded at a melt temperature of 249° C. to form spunbonded nonwoven webs. Webs having two different basis weights were prepared, namely, 1.6 osy (about 54 gsm) and 2.5 osy (about 85 gsm). The tensile strength data are summarized in Tables 5 and 6. Each web is identified by the composition name or letter from which it was prepared. The "GSM" column indicates the basis weight of each web in grams per square meter.

TABLE 5

Tensile Strength Characteristics

| Web | GSM | Direction | Peak Energy (m − kgF) | Percent Increase | Peak Load (kgF) | Percent Increase |
|---|---|---|---|---|---|---|
| Control | 54 | MD | 4.20 | — | 16.2 | — |
|  |  | CD | 3.79 | — | 12.1 | — |
|  | 85 | MD | 7.81 | — | 24.8 | — |
|  |  | CD | 6.39 | — | 19.2 | — |
| C | 54 | MD | 9.97 | 137 | 20.8 | 28 |
|  |  | CD | 9.24 | 144 | 16.4 | 36 |
|  | 85 | MD | 14.4 | 84 | 31.8 | 28 |
|  |  | CD | 14.9 | 133 | 26.6 | 38 |

TABLE 6

Tensile Strength Characteristics

| Web | GSM | Direction | Percent Elongation | Percent Increase |
|---|---|---|---|---|
| Control | 54 | MD | 50.0 | — |
|  |  | CD | 70.0 | — |
|  | 85 | MD | 51.9 | — |
|  |  | CD | 59.1 | — |
| C | 54 | MD | 86.8 | 74 |
|  |  | CD | 106 | 52 |
|  | 85 | MD | 80.7 | 55 |
|  |  | CD | 103 | 74 |

Again, the use of a composition of the present invention resulted in significant increases in the tensile strength characteristics of the nonwoven webs. This time, however, all tensile strength characteristics improvements were more pronounced in the cross direction than in the machine direction. Inclusion of the alkyl-substituted polysiloxane in the composition from which the nonwoven webs were prepared resulted in significant increases in both peak energy and percent elongation for the 54 gsm basis weight nonwoven web. The peak load values did not change significantly, however.

Figure 5:
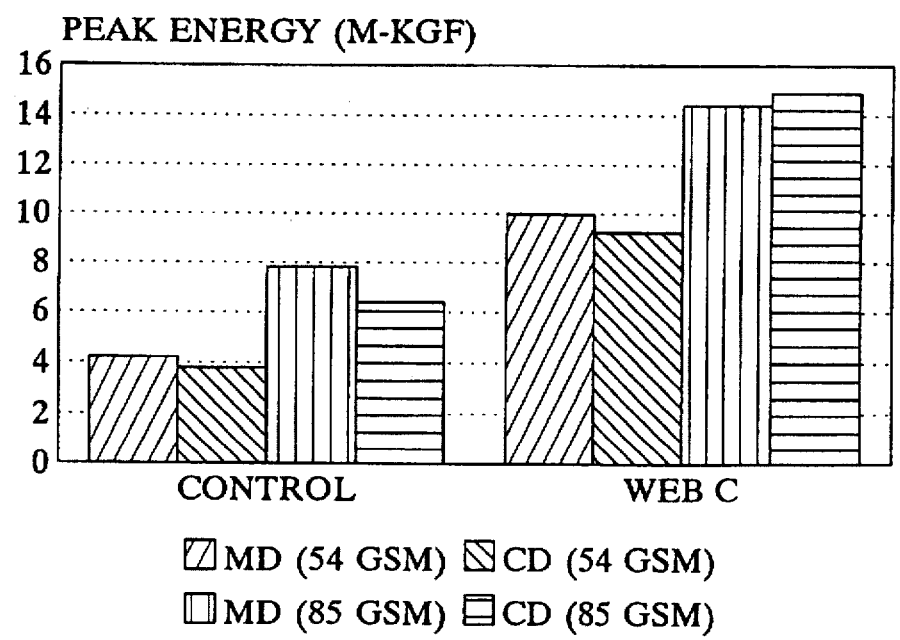
Figure 6:
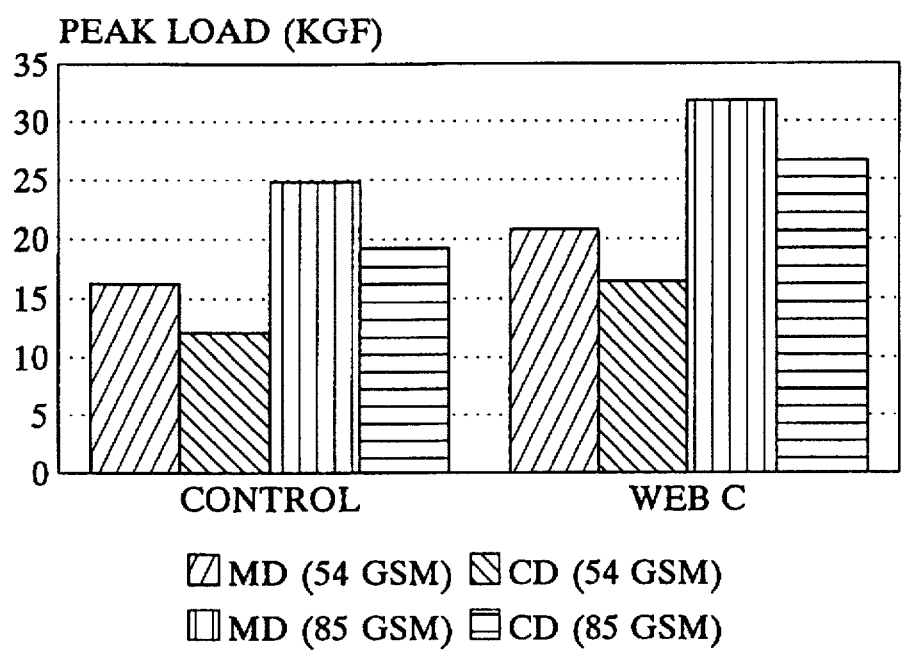
Figure 7:
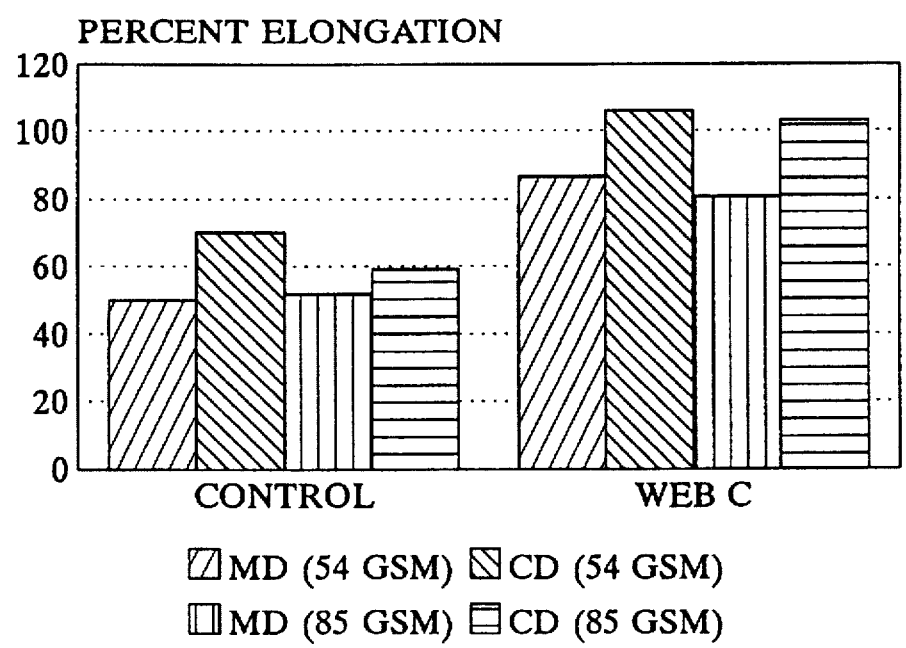

To aid in the visualization of the improvements demonstrated by the data in Tables 5 and 6, the data have been plotted as bar graphs as shown in FIGS. 5–7, inclusive. As before, both the machine direction value and the cross direction value for each web are included in each figure.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A composition comprising a melt-extrudable thermoplastic polypropylene composition having:

a melt flow rate in a range of from about 18 to about 30 g/10 minutes at a temperature of 190° C. and a load of 2.16 kg;

a polydispersity less than 4; and a Z-average molecular weight greater than 300,000 as determined by differential refractometry.

2. The composition of claim 1 which further comprises from about 0.1 to about 1 percent by weight, based on the weight of the thermoplastic polypropylene, of an alkyl-substituted polysiloxane having the general formula,

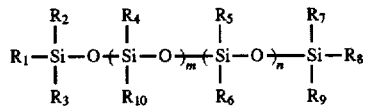

in which:

R$_1$–R$_9$ are independently selected monovalent C$_1$–C$_3$ alkyl groups;

R$_{10}$ is a monovalent C$_6$–C$_{30}$ alkyl group;

m represents an integer of from about 5 to about 50;

n represents an integer of from 0 to about 200;

the alkyl-substituted polysiloxane has a number-average molecular weight of from about 3,000 to about 36,000; and the alkyl-substituted polysiloxane has a polydispersity of from about 1.1 to about 2.5.

3. The composition of claim 1 wherein the polypropylene composition comprises:

a first thermoplastic polypropylene having a melt flow rate lower than 18 g/10 minutes at a temperature of 190° C. and a load of 2.16 kg; and a second thermoplastic polypropylene having a melt flow rate higher than 18 g/10 minutes at a temperature of 190° C. and a load of 2.16 kg, wherein the weight ratio of the first polypropylene to the second polypropylene is in the range of about 90:10 to about 10:90.

4. The composition of claim 2 wherein the polypropylene composition comprises:

a first thermoplastic polypropylene having a melt flow rate lower than 18 g/10 minutes at a temperature of 190° C. and a load of 2.16 kg; and a second thermoplastic polypropylene having a melt flow rate higher than 18 g/10 minutes at a temperature of 190° C. and a load of 2.16 kg, wherein the weight ratio of the first polypropylene to the second polypropylene is in the range of about 90:10 to about 10:90.

5. The composition of claim 3, in which the first polypropylene has a melt flow rate in a range of from about 1 to about 10 g/10 minutes at a temperature of 190° C. and a load of 2.16 kg.

6. The composition of claim 4, in which the first polypropylene has a melt flow rate in a range of from about 1 to about 10 g/10 minutes at a temperature of 190° C. and a load of 2.16 kg.

7. The composition of claim 3, in which the second polypropylene has a melt flow rate in a range of from about 20 to about 50 g/10 minutes at a temperature of 190° C. and a load of 2.16 kg.

8. The composition of claim 4, in which the second polypropylene has a melt flow rate in a range of from about 20 to about 50 g/10 minutes at a temperature of 190° C. and a load of 2.16 kg.

9. The composition of claim 2, in which each of R$_1$–R$_9$ is a methyl group, R$_{10}$ is a monovalent C$_{15}$–C$_{22}$ alkyl group, m represents an integer of from about 15 to about 25, n represents an integer of from about 40 to about 80, and the alkyl-substituted polysiloxane has a number-average molecular weight of from about 8,000 to about 15,000.

10. A melt-extruded fiber prepared from the composition of claim 1.

11. A melt-extruded fiber prepared from the composition of claim 2.

* * * * *